J. H. MADISON, Jr.
VEHICLE BODY.
APPLICATION FILED AUG. 12, 1916.
1,242,221.
Patented Oct. 9, 1917.
2 SHEETS—SHEET 1.
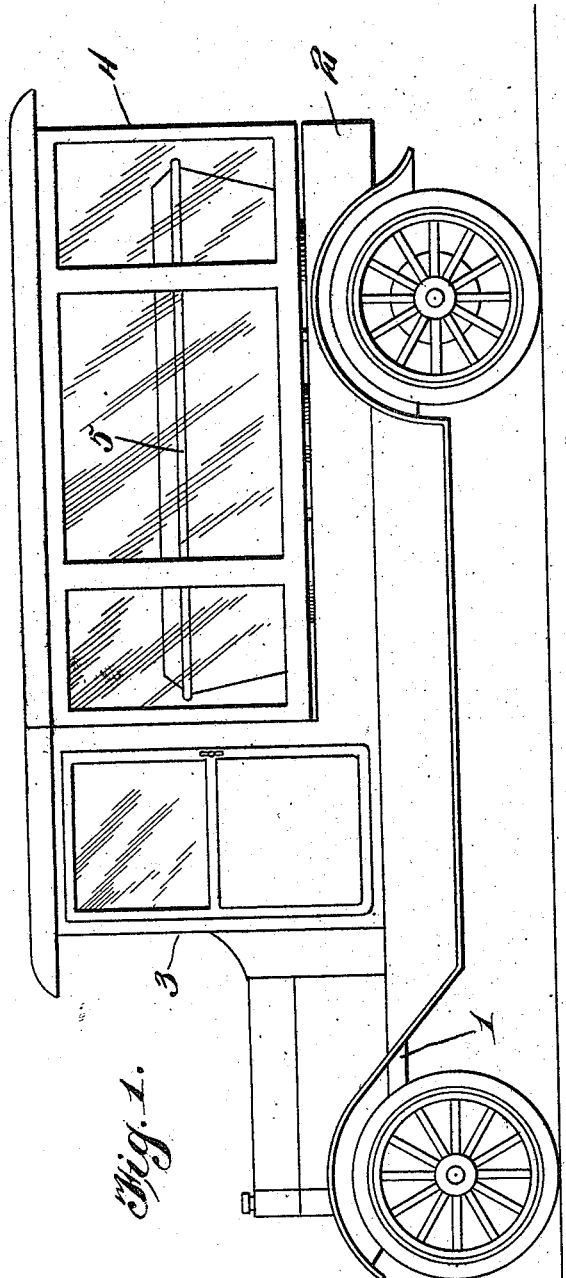
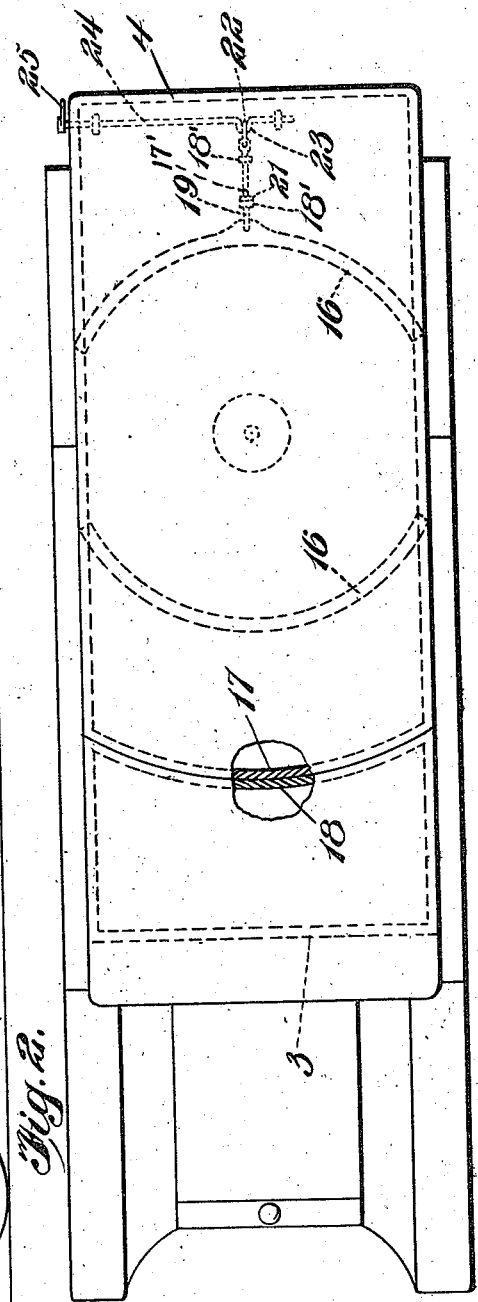
Inventor
John H. Madison, Jr.,
By 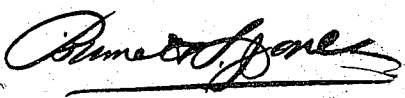
Attorney

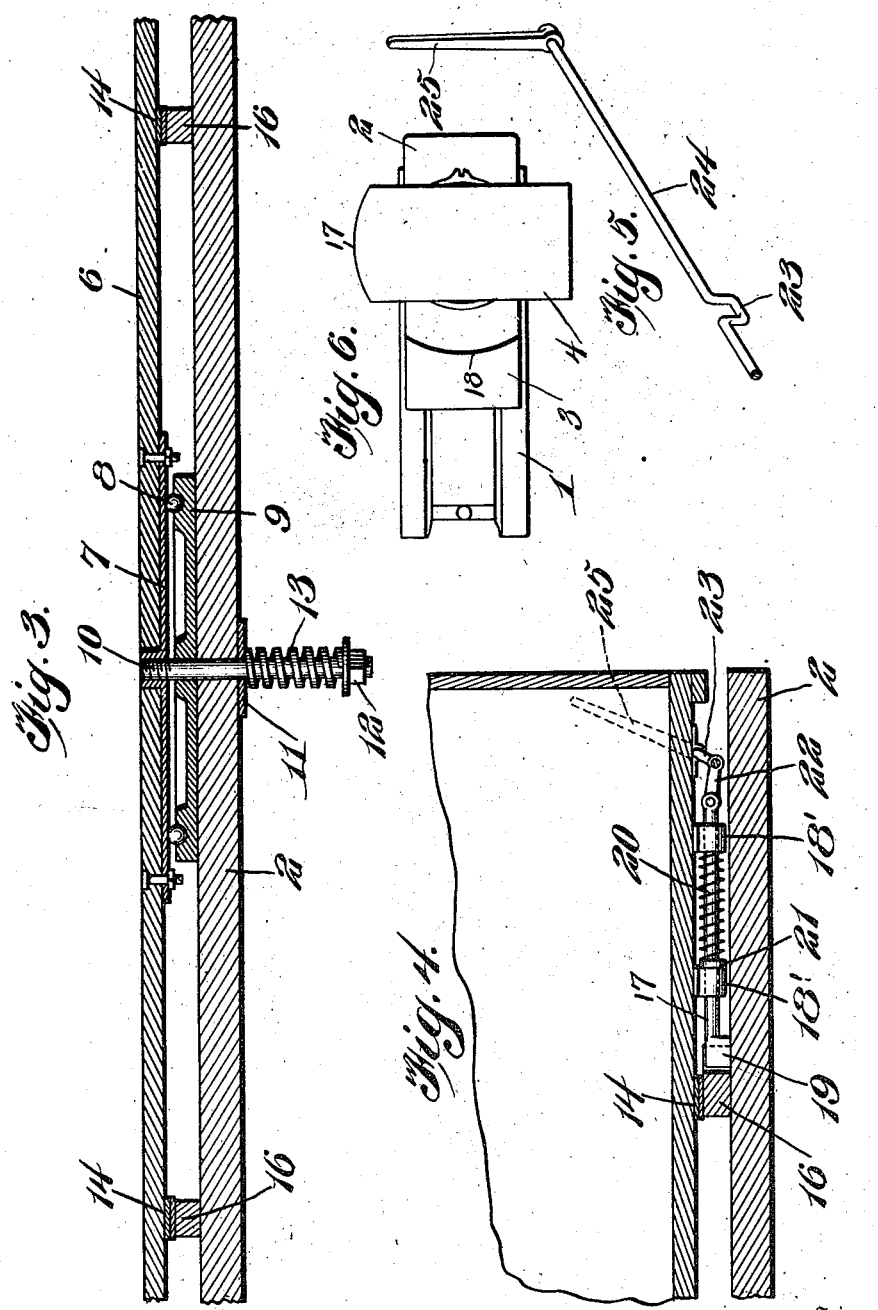

UNITED STATES PATENT OFFICE.

JOHN H MADISON, JR., OF LAKE GENEVA, WISCONSIN.

VEHICLE-BODY.

1,242,221.     Specification of Letters Patent.     Patented Oct. 9, 1917.

Application filed August 12, 1916. Serial No. 114,629.

*To all whom it may concern:*

Be it known that I, JOHN H. MADISON, Jr., a citizen of the United States, residing at Lake Geneva, in the county of Walworth and State of Wisconsin, have invented certain new and useful Improvements in Vehicle-Bodies, of which the following is a specification.

This invention relates to improvements in vehicle bodies, the object of the invention being to provide a body for hearses and other vehicles, in which the receiving portion of the body is pivotally mounted so as to be turned around to a position at right angles to its normal position, allowing convenient access to the interior of such portion of the body while the vehicle stands in a position parallel with the street curb.

Another object of the invention is to provide a vehicle body with a swinging receiving portion, which will be firmly and stably supported in any of its positions and which may be readily and conveniently swung or turned on its pivotal connection.

A still further object of the invention is to provide a body comprising a cab or driver's seat portion and a swinging receiving portion, together with means for maintaining a close connection between the same when the receiving portion is in normal position, and means for locking the receiving portion in such position against liability of displacement.

With these and other objects in view, the invention consists in the features of construction and the combination and arrangement of parts which will be hereinafter described, defined in the appended claims and illustrated in the accompanying drawings, in which:

Figure 1 is a side elevation showing the application of the invention to an automobile hearse;

Fig. 2 is a top plan view of the same;

Fig. 3 is a vertical longitudinal section through the bed and receiving portion of the body, and showing the means for pivotally mounting said receiving position;

Fig. 4 is a vertical longitudinal section through the bed and receiving portion, and showing the locking means;

Fig. 5 is a perspective view of the rock shaft and lever for actuating the locking rod or bolt.

Fig. 6 is a top plan view of the vehicle, showing the body turned to a position at right angles to its normal position.

Referring to the drawings, 1 designates the frame or chassis of the vehicle, which supports a bed or platform 2 carrying the body proper, which is herein shown as comprising a vehicle cab or driver's compartment 3 and a rear receiving portion or compartment 4.

The driver's compartment or cab 3 is rigidly fixed in position upon the frame and may contain one or more seats for the accommodation of the driver and one or more passengers, while the rear or receiving compartment 4 is mounted to swing upon the bed or platform 2 from a normal position parallel with the frame to a discharging or receiving position at right angles thereto, or to an intermediate position.

The invention is shown in the present instance as embodied in an automobile hearse, and the swinging receiving portion or compartment 4, which may be generally similar in form, shape and construction to an ordinary hearse body, is adapted for the reception of the casket 5, and may be provided at its rear end with a door or doors, not shown, for the purpose of permitting the casket to be inserted and removed.

As shown particularly in Fig. 3, the bottom 6 of the compartment 4 has fixed thereto an upper turn table plate 7 which is mounted to turn on anti-friction bearings 8 carried by a lower turn table plate 9 fixed to the bed or platform 2, whereby ease of swinging motion of the compartment 4 is obtained. Fixed to the bottom 6 is a pivot bolt 10 which extends downwardly through bearing openings in the turn table plate 9, platform 2 and a bearing plate 11 arranged beneath said platform, and is threaded at its lower end to receive a retaining and adjusting nut 12. A coiled spring 13 surrounds the depending end of the bolt between the plate 11 and nut 12 and exerts its expansive force to normally draw the compartment 4 downwardly so as to maintain the upper turn table plate in close contact with the anti-friction bearings 8 and prevent any tendency to tilting motion of the compartment 4 when in normal or adjusted positions.

It will be understood that the compartment 4 swings on the pivot pin or bolt 10 as a center, said pin or bolt being disposed centrally of said compartment, and mounted upon the bottom 6 of said compartment at points in front and rear of and equi-distantly from said pivot bolt are segmental track plates or rails 14 which run in contact with similar track plates or rails 16 fixed to the bed or platform 2, whereby the compartment 4 is firmly and stably supported when in normal position parallel with the frame of the vehicle. The forward portion of the compartment 4 is provided with a curved end wall 17 concentric with the pivot 10 and which is adapted to engage the similarly curved rear wall 18 of the cab 3, whereby a close fit between such parts of the body of the vehicle is obtained when the compartment 4 is in normal position.

It will be readily understood from the foregoing description that by the construction described the receiving compartment 4 of the vehicle may be swung around to a position at right angles to the remainder of the vehicle, while the latter is standing in a position parallel with the curb of a street, so that the casket may be more readily and conveniently inserted and removed, without the necessity of turning the same around and also without the necessity of the vehicle backing up to the curb and projecting a material distance into the street. It will be evident also that the adaptability of the compartment 4 to swing at an angle to the line of the vehicle provides for more ready and convenient access to the interior of said compartment under many other conditions or situations. While the invention is shown in the present instance embodied in a funeral car or hearse, it is evident that the same principle of construction may be applied to delivery wagons and many other kinds of vehicles, and hence it will be understood that the invention is not restricted in its application to any particular type of vehicle, but may be employed in connection with any form of vehicle for which it is adapted.

In order to lock the compartment 4 in normal position, I provide a locking means comprising a longitudinally sliding locking bolt 17' mounted in guides 18' on the under side of the compartment 4 and having its forward end arranged to engage a keeper 19 fixed to the bed or platform 2, the bolt being normally held in locking position by the action of a coiled spring 20 surrounding the same between a collar or abutment 21 thereon and one of the guides 18', by means of which the bolt will be normally held in engagement with the keeper against any possibility of casual displacement. The rear end of the bolt is connected by a link 22 with a crank 23 on a transverse rock shaft 24 journaled upon the under side of the compartment 4 and having one of its ends projecting laterally beyond said compartment and provided with a lever or handle 25 by which it may be actuated to retract or control the motion of the bolt, as will be readily understood. It will, of course, be understood that any other suitable type of locking means for the purpose may be employed.

Having thus described my invention, I claim:

1. A vehicle body having a fixed forward cab compartment, a rear storage or receiving compartment, a pivot bolt pivotally mounting said storage or receiving compartment to swing between a normal position and a position at right angles to the line of the vehicle, a turn table composed of parts arranged concentric with said pivot bolt for supporting the receiving compartment in its movements, segmental tracks concentric with the pivot bolt and turn table, for guiding and supporting the receiving compartment between said turn table and its end portions, a keeper member upon a fixed portion of the vehicle, a longitudinally movable spring projected bolt upon the receiving compartment to engage said keeper member, a transverse crank shaft upon the receiving compartment for actuating said bolt, and means for actuating said shaft.

2. A vehicle body including a bed or platform, a fixed forward cab compartment, a rear swinging compartment, said compartments having curved walls for contact when the swinging compartment is in normal position, turn table members carried by the swinging compartment and bed or platform, segmental track elements upon the bed or platform and swinging compartment arranged in front and rear of said turn table elements, a keeper fixed to said platform rearwardly of the rear track element, a tensioned sliding bolt carried by the bottom of the swinging compartment adapted to have the forward end thereof received in said keeper to prevent relative movement of the swinging compartment and platform, means for operating the sliding bolt, a pivot bolt upon the swinging compartment extending downwardly through the bed or platform at the center of the turn table elements, and a spring acting upon said bolts to draw the swinging compartment downwardly and hold said turn table elements and track elements in contactual relation.

In testimony whereof I affix my signature in the presence of two witnesses.

JOHN H. MADISON, Jr.

Witnesses:
FRANKLIN J. TYRRELL,
JOSEHINE M. TYRRELL.